(12) United States Patent
Alvanos et al.

(10) Patent No.: US 8,839,219 B2
(45) Date of Patent: Sep. 16, 2014

(54) DATA PREFETCHING AND COALESCING FOR PARTITIONED GLOBAL ADDRESS SPACE LANGUAGES

(71) Applicants: Michail Alvanos, Barcelona (ES); Ettore Tiotto, Markham (CA)

(72) Inventors: Michail Alvanos, Barcelona (ES); Ettore Tiotto, Markham (CA)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 13/659,048

(22) Filed: Oct. 24, 2012

(65) Prior Publication Data

US 2013/0167130 A1    Jun. 27, 2013

(30) Foreign Application Priority Data

Dec. 23, 2011  (CA) .................................. 2762563

(51) Int. Cl.
    *G06F 9/45*           (2006.01)
(52) U.S. Cl.
    USPC ........................... 717/160; 717/150; 717/154
(58) Field of Classification Search
    CPC ...... G06F 8/4452; G06F 8/443; G06F 8/4442
    See application file for complete search history.

(56) References Cited

U.S. PATENT DOCUMENTS

| | | | |
|---|---|---|---|
| 6,920,485 B2 | 7/2005 | Russell | |
| 7,168,070 B2* | 1/2007 | Archambault et al. | 717/154 |
| 7,302,680 B2* | 11/2007 | Collard et al. | 717/160 |
| 7,386,842 B2* | 6/2008 | Eichenberger et al. | 717/150 |
| 7,730,463 B2* | 6/2010 | Eichenberger et al. | 717/150 |
| 7,895,400 B2 | 2/2011 | O'Krafka et al. | |
| 8,146,067 B2* | 3/2012 | Eichenberger et al. | 717/150 |
| 8,171,464 B2* | 5/2012 | Eichenberger et al. | 717/150 |
| 8,234,636 B2* | 7/2012 | Kawahito et al. | 717/154 |
| 2005/0149903 A1 | 7/2005 | Archambault et al. | |

(Continued)

FOREIGN PATENT DOCUMENTS

WO    2008016515 A2    2/2008

OTHER PUBLICATIONS

Alvanos et al., "Automatic Communication Coalescing for Irregular Computations in UPC Language", 2012 IBM Canada Ltd; pp. 220-234; <http://dl.acm.org/results.cfm?h=1&cfid=396329934&cftoken=31652150>.*

(Continued)

*Primary Examiner* — Thuy Dao
*Assistant Examiner* — Ben C Wang
(74) *Attorney, Agent, or Firm* — Yudell Isidore Ng Russell PLLC; Parashos Kalaitzis (57) ABSTRACT

An illustrative embodiment of a computer-implemented process for shared data prefetching and coalescing optimization versions a loop containing one or more shared references into an optimized loop and an un-optimized loop, transforms the optimized loop into a set of loops, and stores shared access associated information of the loop using a prologue loop in the set of loops. The shared access associated information pertains to remote data and is collected using the prologue loop in absence of network communication and builds a hash table. An associated data structure is updated each time the hash table is entered, and is sorted to remove duplicate entries and create a reduced data structure. Patterns across entries of the reduced data structure are identified and entries are coalesced. Data associated with a coalesced entry is pre-fetched using a single communication and a local buffer is populated with the fetched data for reuse.

20 Claims, 6 Drawing Sheets

(56) References Cited

U.S. PATENT DOCUMENTS

| | | | |
|---|---|---|---|
| 2008/0046657 A1 | 2/2008 | Eichenberger et al. | |
| 2008/0222623 A1* | 9/2008 | Eichenberger et al. | 717/160 |
| 2008/0301390 A1 | 12/2008 | Leinberger et al. | |
| 2009/0064119 A1* | 3/2009 | Archambault et al. | 717/160 |
| 2010/0218196 A1* | 8/2010 | Leung et al. | 717/160 |
| 2011/0029962 A1* | 2/2011 | Nuzman et al. | 717/160 |
| 2012/0331453 A1* | 12/2012 | Nuzman et al. | 717/160 |
| 2013/0125105 A1* | 5/2013 | Gao et al. | 717/160 |

OTHER PUBLICATIONS

Serres et al., "Address Translation Optimization for Unified Parallel C Multi-Dimensional Arrays", 2011 IEEE; pp. 1191-1198; <http://ieeexplore.ieee.org/stamp/stamp.jsp?tp=&arnumber=6008969>.*

Alvanos et al., "Improving Communication in PGAS Environments—Static and Dynamic Coalescing in UPC", 2013 ACM, ICS'13, Jun. 10-14, 2013 Engene, Oregon, USA; pp. 129-138; <http://dl.acm.org/results.cfm?h=1&cfid=396329934&cftoken=31652150>.*

Yelick et al., "Productivity and Performance Using Partitioned Global Address Space Languages", 2007 ACM, PASCO'07, Jul. 27-28, 2007, London, Ontario, Canada; pp. 1-9; <http://dl.acm.org/results.cfm?h=1&cfid=396329934&cftoken=31652150>.*

Alvanos et al., "Automatic Communication Coalescing for Irregular Computations in UPC Language", Nov. 6, 2012 IBM Canada Ltd; pp. 220-234; <http://dl.acm.org/results.cfm?h=1&cfid=396329934&cftoken=31652150>.*

Bell et al., "Evaluating Support for Global Address Space Languages on the Cray X1", 2004 ACM, ICS'04, Jun. 26-Jul. 1, 2004, Malo, France; pp. 1-11; <http://dl.acm.org/results.cfm?h=1&cfid=396329934&cftoken=31652150>.*

Chen et al., "Auto. Nonblocking Comm. for Partitioned Global Address Space Programs", 2007 ACM, ICS'07, Jun. 18-20, Seattle, WA, USA; pp. 158-167; <http://dl.acm.org/results.cfm?h=1&cfid=396329934&cftoken=31652150>.*

Serres et al., "Address Translation Optimization for Unified Parallel C Multi-Dimensional Arrays", 2011 IEEE; IPDPSW, May 16-20, 2011, pp. 1191-1198; <http://ieeexplore.ieee.org/stamp/stamp.jsp?tp=&arnumber=6008969>.*

Monteiro et al., "Parallelizing Irregular Algorithms—A Pattern Language", Oct. 2011, 18th Conference on Pattern Languages of Programs (PLoP 2011), Portland, Oregon USA; pp. 1-17; <http://www.hillside.net/plop/2011/papers/A-24-Monteiro.pdf>.*

* cited by examiner

```
for( i=0; i<N; i++){
    c[i+1] = a[i+1] + b[i+1] + d[i]
}                                                                    500

PF = __prefetch_factor()                    502 if (PF) { /* Optimized Version */           504
    /* Prologue loop */                     506
    for(i=0; i<PF; i++) {
        __add_access( flag, &a[i+j], sizeof(a[i+j]) );      508
        __add_access( flag, &b[i+j], sizeof(b[i+j]) );
    } schedule( flag );  /* Schedule the accesses */          510

/* Main loop */                         512
    for(i=0;i<(N-N%BF);i+=(PF)){
        /* Inner prologue loop */           514
        flag_reverse = !flag;
        for(j=0; i+j< MIN(N,2*PF+i); j++) {
            __add_access( flag_reverse, &a[i+j], sizeof(a[i+j]) );   508'
            __add_access( flag_reverse, &b[i+j], sizeof(b[i+j]) );
        } schedule( flag_reverse ); /* Schedule the accesses */    510' for( j=0; j<(PF); j++ ){                            516
            buff1 = __deref(&idx1, flag, &a[i+j], sizeof(a[i+j]));
            buff2 = __deref(&idx2, flag, &b[i+j], sizeof(b[i+j]));

c[i+j+1] = buff1[idx1] + buff2[idx2] + d[i+j];
        }
        __upc_prefetch_reset(flag);         518
        flag = !flag;
    }
                                            520
    __upc_prefetch_wait(flag);
                                            522
    /* Residual loop: epilog loop */
    for(i=N-N%BF; i<N; i++) {
        buff1 = __deref(&idx1, flag, &a[i+j], sizeof(a[i+j]));
        buff2 = __deref(&idx2, flag, &b[i+j], sizeof(b[i+j]));

c[i+1] = buff1[idx1] + buff2[idx2] + d[i];
    }
    __prefetch_reset(flag);
}                                           524
else { /* Original Loop Version */
    for( i=0; i<N; i++){
        c[i+1] = a[i+1] + b[i+1] + d[i]
    }
}
```

FIG. 6 ously stated conditions hold. Existing static analysis techniques focus on the UPC work sharing loop construct (upc_forall) and, for each shared array access in the parallel loop attempt to determine whether the array element referenced by the executing thread resides in the portion of the shared memory space allocated with affinity to a particular thread. When established, this relationship between an accessing thread and a shared memory storage location of an array element can be used by a compiler to optimize the communication requirements of the program.

DATA PREFETCHING AND COALESCING FOR PARTITIONED GLOBAL ADDRESS SPACE LANGUAGES

GOVERNMENT RIGHTS

This invention was made with United States Government support under Agreement No. HR0011-07-9-0002 awarded by DARPA. The Government has certain rights in the invention.

PRIORITY CLAIM

The present application claims benefit of priority under 35 USC §120 and §365 to the previously filed Canada Patent Application No. 2762563 titled, "Data Prefetching and Coalescing for Partitioned Global Address Space Languages" with a priority date of Dec. 23, 2011. The content of that application is incorporated by reference herein.

BACKGROUND

1. Technical Field

This disclosure relates generally to software for data prefetching in a data processing system and more specifically to software for shared data prefetching and coalescing using partitioned global address space languages programming loops in the data processing system.

2. Description of the Related Art

Partitioned Global Address Space (PGAS) programming languages offer a high-productivity programming model for parallel programming which is attractive to application developers. PGAS languages, such as Unified Parallel C (UPC) and Co-array Fortran, combine the simplicity of shared-memory programming with the efficiency of the message-passing paradigm (MPI). Both languages are increasingly attractive alternatives to previous established parallel programming models due to conceptual simplicity and performance potential at a reduced level of program complexity.

Most of the execution time of typical PGAS application programs is consumed in performing data transfers to and from a distributed shared address space. Shared data is typically distributed across a large number of cluster nodes; therefore accessing shared data typically involves network communication between nodes. The need to transfer data between different cluster nodes often becomes a performance bottleneck for this type of application programs.

In one example an existing optimization solution attempts to reduce the number of data transfers flowing across the communication network by coalescing shared accesses to elements of the same shared array together when a compiler can prove the shared accesses are executed by the same thread and map to shared storage associated with a remote thread. The existing approach requires the compiler to ensure the two previously stated conditions hold. Existing static analysis techniques focus on the UPC work sharing loop construct (upc_forall) and, for each shared array access in the parallel loop attempt to determine whether the array element referenced by the executing thread resides in the portion of the shared memory space allocated with affinity to a particular thread. When established, this relationship between an accessing thread and a shared memory storage location of an array element can be used by a compiler to optimize the communication requirements of the program.

Two possible optimizations driven by the result of the analysis are privatization and coalescing of shared memory accesses. The privatization optimization targets shared accesses that have proven affinity with the executing thread (shared accesses have associated storage physically located on the cluster node where the executing threads runs). The coalescing optimization targets shared accesses that have proven affinity with the same remote thread (a thread that runs on a different cluster node from the one where the executing thread runs on). Static analysis may be able to coalesce data when a physical data mapping is available, for example, a number of threads and number of nodes is known at compile time.

The existing static locality analysis techniques address upc_forall loops and are typically of no use for other commonly used loop constructs such as for loops and do/while loops. Furthermore the existing locality analysis techniques may not have sufficient information, at compile time, to successfully analyze all shared accesses in upc_forall loops. A UPC program typically makes extensive use of loop constructs other than the upc_forall work sharing construct and consequently leaves substantial optimization opportunities that are not addressed by existing technology.

SUMMARY

According to one embodiment, a computer-implemented process for shared data prefetching and coalescing optimization that, responsive to a determination that there is one or more shared references in a loop, versions the loop into an optimized loop and an un-optimized loop and transforms the optimized loop into a set of loops, and stores shared access associated information of the loop using a prologue loop in the set of loops. The shared access associated information pertains to remote data and is collected using the prologue loop in absence of network communication. The computer-implemented process further builds a hash table of entries, where each entry contains a pairing of a shared access variable and a UPC thread ID, updates a data structure associated with the hash table each time the hash table is entered, and sorts the data structure by entry to remove duplicate entries from the data structure to create a reduced data structure. The computer-implemented process further identifies patterns across entries of the reduced data structure, coalesces entries of the reduced data structure, fetches data associated with a coalesced entry using a single network communication, and populates a local buffer with the fetched data for reuse.

According to another embodiment, a computer program product for shared data prefetching and coalescing optimization comprises a computer readable storage device containing computer executable program code stored thereon. The computer executable program code comprises computer executable program code, responsive to a determination that there is one or more shared references in a loop, for versioning the loop into an optimized loop and an un-optimized loop; computer executable program code for transforming the optimized loop into a set of loops; computer executable program code for storing shared access associated information of the loop using a prologue loop in the set of loops, where the shared access associated information pertains to remote data and is collected using the prologue loop in absence of network communication. The computer executable program code further comprises computer executable program code for building a hash table of entries, where each entry contains a pairing of a shared access variable and a UPC thread ID; computer executable program code for updating a data structure associated with the hash table each time the hash table is entered; computer executable program code for sorting the data structure by entry; computer executable program code for removing duplicate entries from the data structure to create a reduced data structure; computer executable program code for identifying patterns across entries of the reduced data structure; computer executable program code for coalescing entries of the reduced data structure; computer executable program code for fetching data associated with a coalesced entry using a single network communication; and computer executable program code for populating a local buffer with the fetched data for reuse.

According to another embodiment, a system for shared data prefetching and coalescing optimization comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the system responsive to a determination that there is one or more shared references in a loop, to version the loop into an optimized loop and an un-optimized loop, transform the optimized loop into a set of loops, and store shared access associated information of the loop using a prologue loop in the set of loops, wherein the shared access associated information pertains to remote data and is collected using the prologue loop in absence of network communication. The processor unit executes the computer executable program code to further direct the system to build a hash table of entries, where each entry contains a pairing of a shared access variable and a UPC thread ID, update a data structure associated with the hash table each time the hash table is entered, sort the data structure by entry to remove duplicate entries from the data structure to create a reduced data structure. The processor unit executes the computer executable program code to direct the system identify patterns across entries of the reduced data structure, coalesce entries of the reduced data structure, fetch data associated with a coalesced entry using a single network communication and populate a local buffer with the fetched data for reuse.

BRIEF DESCRIPTION OF THE DRAWINGS

The claimed subject matter and equivalents thereof will best be understood by reference to the following detailed description of illustrative embodiments when read in conjunction with the accompanying figures, wherein like reference numerals represent like parts and wherein:

DETAILED DESCRIPTION OF AN ILLUSTRATIVE EMBODIMENT

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in a computer readable storage device, computer usable device, and/or one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage device that can direct a computer, other programmable data processing apparatus, or other devices to function in a particular manner, such that the instructions stored in the computer readable device produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
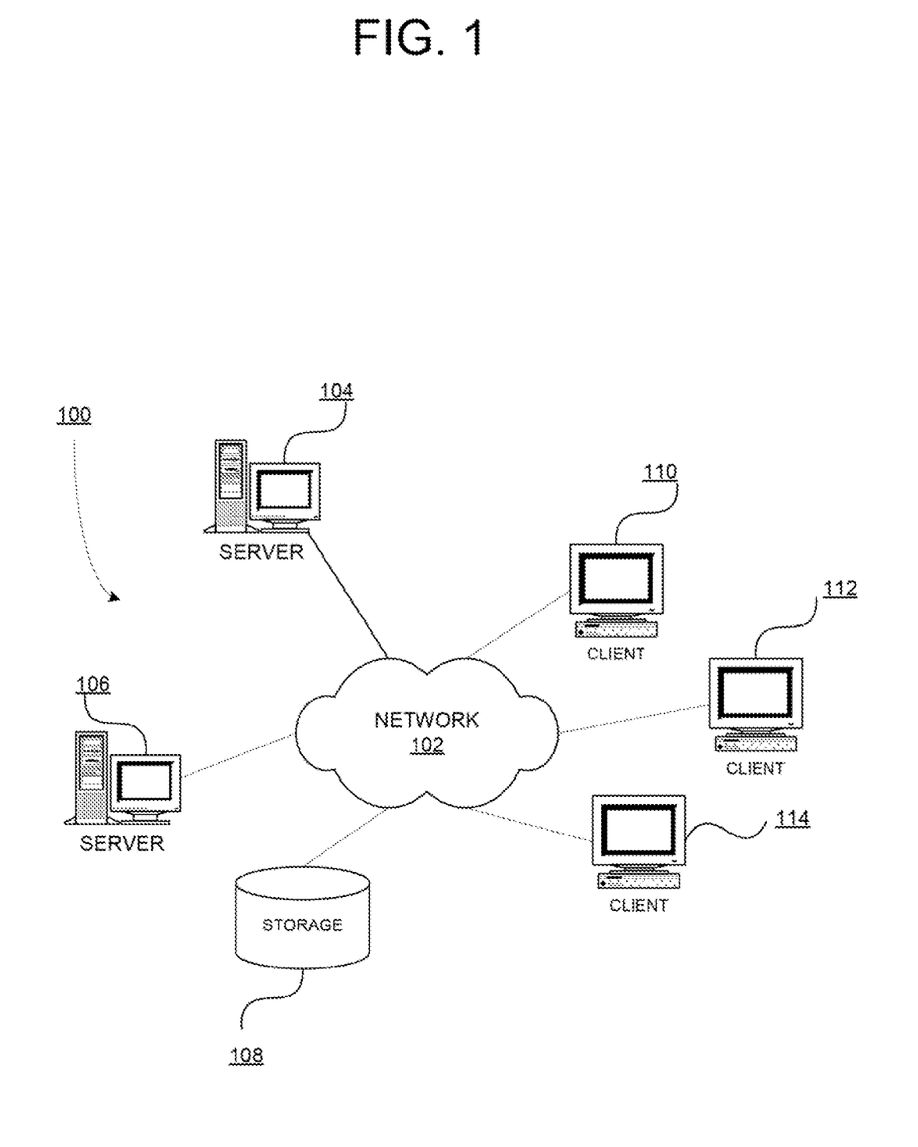
FIG. 1 is a block diagram of an exemplary network data processing system in accordance with one or more embodiments.
Figure 2:
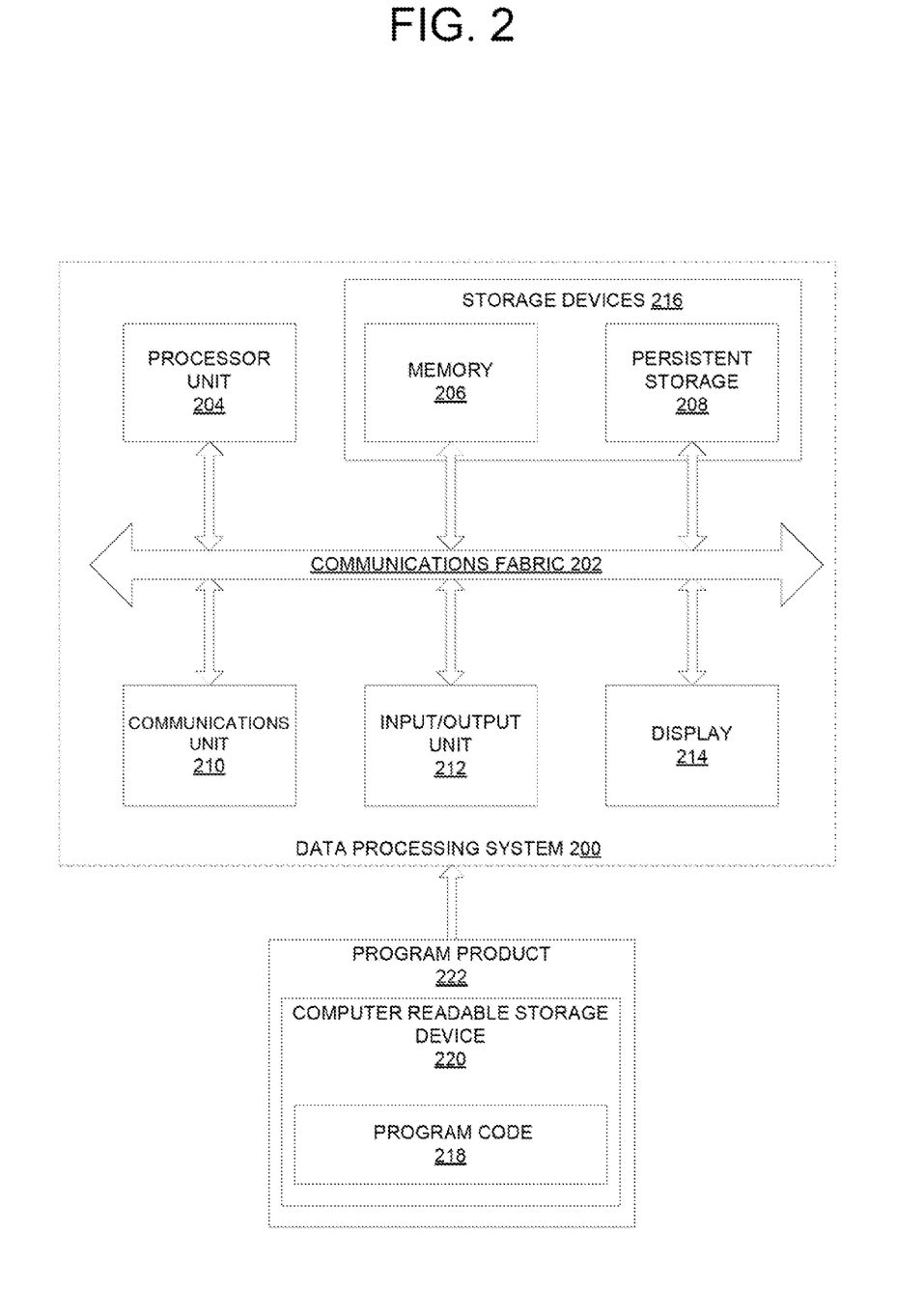
FIG. 2 is a block diagram of an exemplary data processing system in accordance with one or more embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a single processor, a set of one or more processors (each having one or more core), or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links Communications unit 210 may be a network adapter coupled to the system to enable the data processing system to become coupled to other data processing systems or remote printers or storage devices through intervening private or public networks. Modems, cable modems, and Ethernet cards are just a few of the currently available types of network adapters.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Input/output or I/O devices (including but not limited to keyboards, displays, pointing devices, etc.) can be coupled to the system either directly or through intervening I/O controllers of the input/output unit 212. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage device 220 that is selectively removable and may be loaded onto or transferred to data processing system 200 for execution by processor unit 204. Program code 218 and computer readable storage device 220 form computer program product 222 in these examples. In one example, computer readable storage device 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage device 220 also may take the form of a persistent storage, such as a hard drive, a thumb drive, or a flash memory that is connected to data processing system 200. In some instances, computer readable storage device 220 may not be removable.

Alternatively, program code 218 may be transferred to data processing system 200 from computer readable storage device 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for shared data prefetching and coalescing optimization is presented. Processor unit 204, responsive to a determination that there is one or more shared references in a loop, versions the loop into an optimized loop and an un-optimized loop and transforms the optimized loop into a set of loops, storing shared access associated information of the loop using a prologue loop in the set of loops in storage devices 216, wherein the shared access associated information pertains to remote data and is collected using the prologue loop in absence of network communication. The computer-implemented process further builds a hash table of entries in memory 206, wherein each entry contains a pairing of a shared access variable and a UPC thread ID, updates a data structure in storage devices 216 associated with the hash table each time the hash table is entered and sorts the data structure by entry to remove duplicate entries from the data structure to create a reduced data structure. Processor unit 204 further identifies patterns across entries of the reduced data structure, coalesces entries of the reduced data structure, fetches data associated with a coalesced entry using a single network communication through communications unit 210 and populates a local buffer with the fetched data for reuse.

Figure 3:
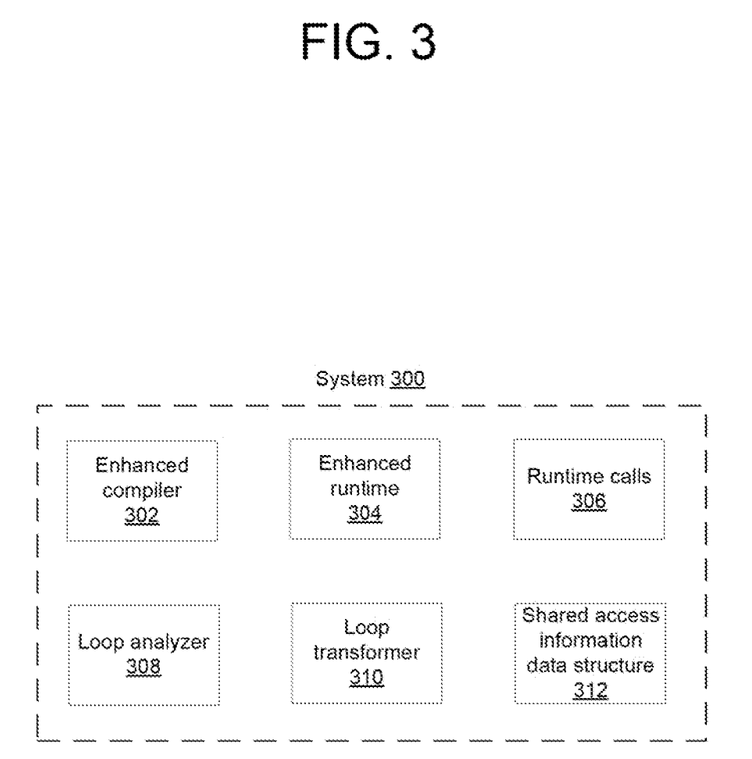
FIG. 3 is a block diagram of components of a shared access data prefetch system in accordance with one or more embodiments.

With reference to FIG. 3 a block diagram of components of a shared access data prefetch and coalescing system operable for various embodiments of the disclosure is presented. System 300 is an example of a shared access data prefetch system in accordance with an embodiment of the disclosure.

System 300 leverages support of a data processing system such as data processing system 200 of FIG. 2 or a system of network data processing system 100 of FIG. 1. System 300 includes a number of components comprising enhanced compiler 302, enhanced runtime 304, runtime calls 306, loop analyzer 308, loop transformer 310 and shared access information data structure 312. System 300 provides a capability of coalescing of remote data accesses associated with a transformed loop to typically increase communication efficiency compared with previous fine-grained communication accesses of an initial loop.

Enhanced compiler 302 is extended to perform analysis of loops that contain shared references. The shared references contained inside the analyzed loop are further analyzed to determine whether the loop is a candidate for prefetching and coalescing analysis. When a candidate loop is identified, enhanced compiler 302 creates two versions of the loop and transforms an optimized version of the loop into a set of loops. The enhanced compiler also creates a temporary symbol (for example, a flag) to identify which buffer in a set of buffers to use for data access. Additional specific runtime calls are inserted into specific versions of the loops in the set of loops wherein the runtime calls perform operations of a collection phase, a scheduling phase and a computation phase.

Enhanced runtime 304 provides a capability for keeping information associated with shared access in shared access information data structure 312, analysis shared accesses and proper scheduling shared access. Enhanced runtime 304 is responsible for tasks including deciding dynamically whether an optimization is worth the cost, storing information associated with the shared references, analyzing the shared references and coalescing remote data access when possible, and retrieving the remote data into the local buffers.

Enhanced runtime 304 is responsible for storing prefetched data into a set of local buffers. Once the runtime has filled one of the buffers with the data that was prefetched the application code (the modified loops created during compilation) will reference (read) the data from this buffer. The buffers are the means of data exchange between code generated by the enhanced compiler and the enhanced runtime system. The optimization can prefetch and coalesce shared data read by the loop being optimized.

Enhanced runtime 304 includes a set of runtime entry points 306 for emulating a shared access (without any network communication), scheduling a shared access, and retrieving coalesced data. Runtime calls 306 comprise a set of calls including add_access to record an access for given shared reference, schedule to trigger the analysis of the shared accesses recorded so far and to carrying out the communication required to retrieve the shared data elements from remote processors, dereference for recovering the data retrieved by the runtime system during the scheduling phase, reset to restore the internal data structures used by the runtime and a wait to cause a pause in processing (for example, to temporarily wait for completion of a data transfer operation).

Loop analyzer 308 provides a capability to analyze a loop and enclosed shared accesses within the loop to determine whether the loop is a candidate for prefetch and coalescing optimizations.

Loop transformer 310 provides a capability to transform an identified loop into a pair of specific loops, wherein one loop is an optimized loop. Loop transformer 310 further provides a capability to transform the optimized loop into a set of loops into which runtime calls selected from runtime calls 306 are selectively placed according to a loop processing protocol.

Shared access information data structure 312 is a memory location established to store information associated with a shared symbol, a related offset inside a respective shared symbol, a blocking factor, element size, a flag, and a type of data access operation (for example, whether the described access is a read operation or a write operation). Additional information representing a hash table containing entries in which each entry is a pair comprising a shared access variable and a UPC thread is also maintained. On each entry use of the hash table the runtime maintains a data structure (for example, a list or an array) of the offsets accessed in shared access information data structure 312. Shared access information data structure 312 may be maintained as a separate entity within system 300 or within enhanced runtime 304.

An embodiment of system 300 provides a capability for performing an optimization which prefetches shared data ahead of a computation that requires the shared data by efficiently coalescing small data transfers into larger and more efficient data transfers. The optimization is generally applicable to any type of loop. The optimization provided in an embodiment of system 300 is also able to cope with a lack of information available during program compilation because processing of needed information is delayed until runtime.

An embodiment of system 300 collects information associated with the shared accesses performed in a loop by each thread and uses the information collected to schedule communication prior to execution of the original loop. An embodiment of system 300 performs the optimization in a set of logical phases comprising a collection phase, a scheduling phase and a computation phase.

The collection phase emulates the shared accesses performed by the original loop (or loop nest) and each access performed by any thread is recorded by enhanced runtime 304. However, during the collection phase no network communication occurs. For example, the shared accesses are described but any communication that may be associated with the shared accesses is not performed.

In the scheduling phase enhanced runtime 304 issues the communication protocols of the shared accesses recorded in the previous collection phase. Enhanced runtime 304 attempts to coalesce shared accesses originating by thread T1 to shared memory allocated on thread T2. Enhanced runtime 304 stores the data retrieved in local buffers. The scheduling phase determines which fine-grained accesses can be profitably coalesced together. The scheduling phase enables dynamic optimization because the scheduling phase is performed during the execution of the optimized program using enhanced runtime 304. The runtime has precise knowledge of which thread originates the shared access and to which shared memory location the access is targeted. The dynamic nature enables the optimization to be generalized and effective for any loop, not just upc_forall loops.

In the computation phase computation performed by the original loop occurs. During the computation phase data retrieved in the prior scheduling phase is processed using the local buffers filled during the scheduling phase. Processing of the original loop in the computation phase typically does not require network communication since the data retrieved in the buffers are now local.

Using the phased approach provides a capability to coalesce fine-grained communication into more efficient coarse grain communication. Using the described phased approach the optimization also overlaps the communication and computation phase, where possible, using a technique similar to a double-buffering technique to further enhance the efficiency of the optimization.

Figure 4:
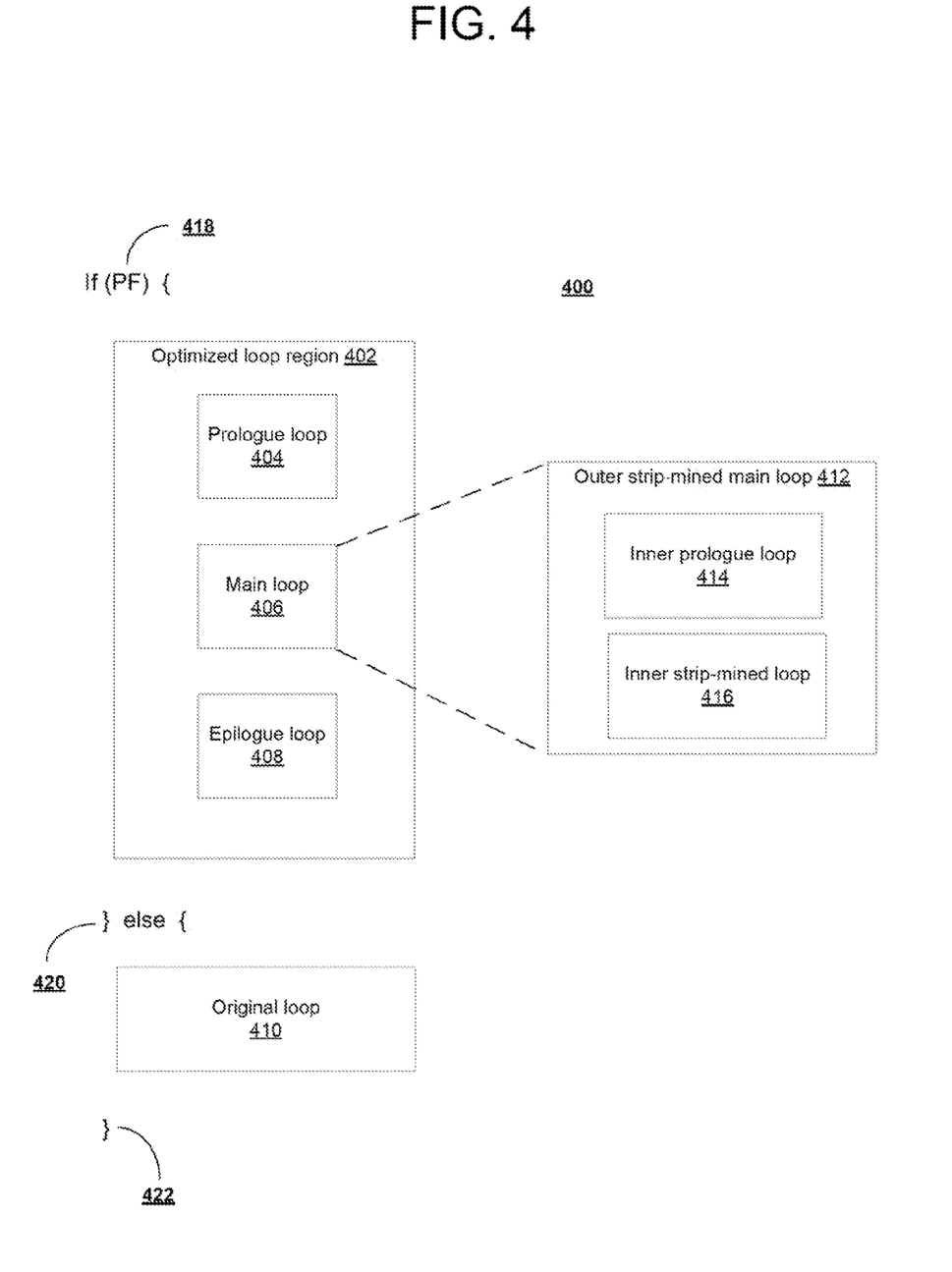
FIG. 4 is a block diagram of a logical view of a transformed loop, in accordance with one embodiment.

With reference to FIG. 4 a block diagram of a logical view of a transformed loop in accordance with one embodiment of the disclosure is presented. View 400 is a logical view of an example of an original loop transformed for prefetching and coalescing operations using system 300 of FIG. 3. This example provides a combination of pseudo-code and logical blocks to describe a relationship between elements in the loop transformations.

Original loop 410 is transformed into optimized loop region 402 which is a block representing a first transformation of original loop 410 into separate loops comprising prologue loop 404, main loop 406 and epilogue loop 408. Main loop 406 (of optimized loop region 402) is processed by a further transformation into a logical set of loops comprising outer strip-mined loop 412 further comprising inner prolog loop 414 and inner strip-mined loop 416.

Logic statement 418 indicates the start of conditional loop processing using a prefetch factor. When predetermined conditions of prefetching are satisfied optimized loop region 402 is executed. Original loop 410 is maintained for processing and controlled by logic statement 420 in the event logic determining whether to use optimized loop region 402 processing is not suitable. Processing of the loop is terminated using logic statement 422.

Figure 5:
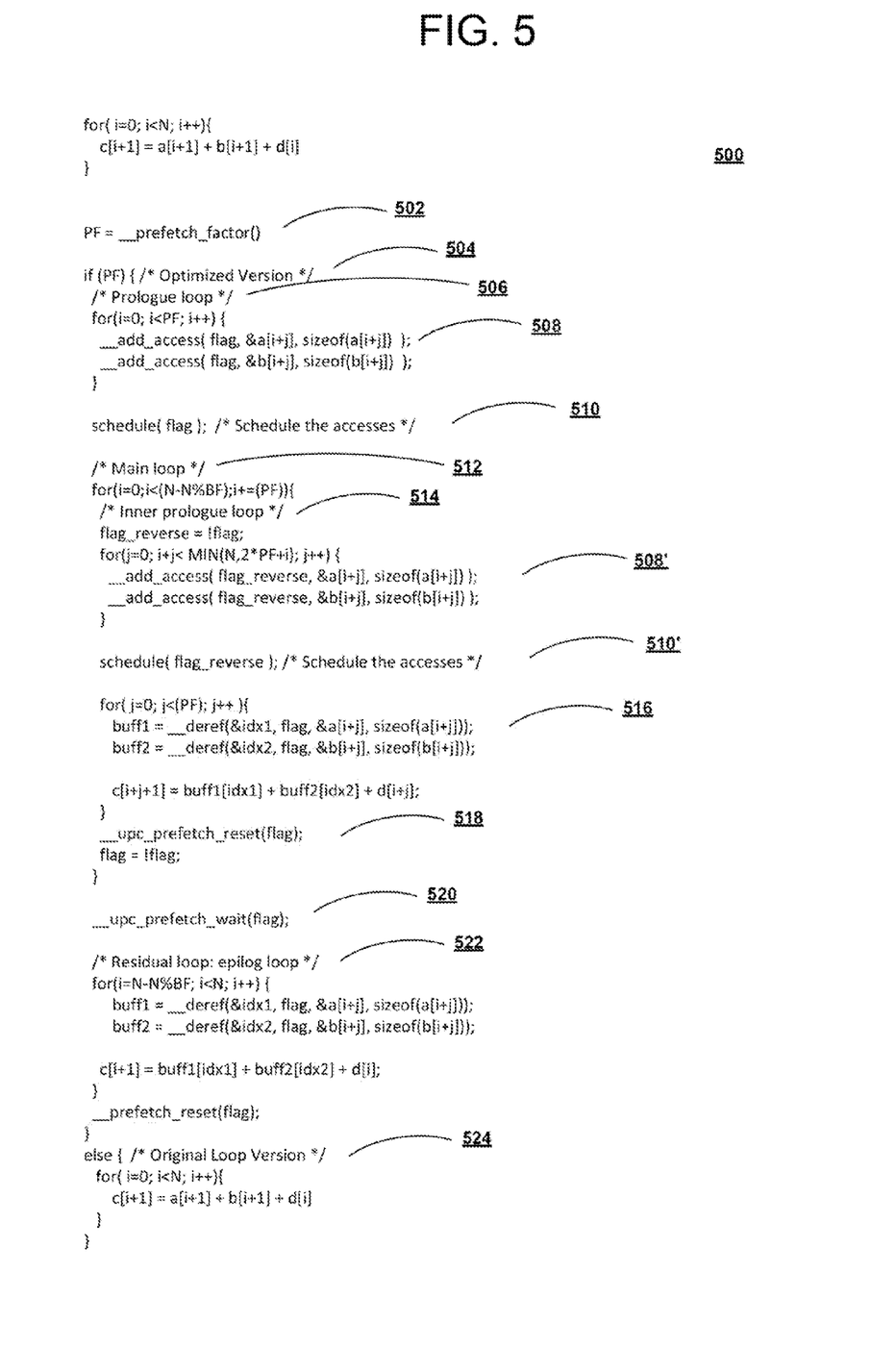
FIG. 5 is a textual representation of the transformed loop of FIG. 4, in accordance with one embodiment.

With reference to FIG. 5 a textual representation of the loop transformation of FIG. 4 in accordance with one embodiment of the disclosure is presented. Code snippet 500 is an example of a loop transformation using system 300 of FIG. 3. The example of code snippet 500 further includes example usage of runtime calls 306 of FIG. 3. In the example of code snippet 500, d[ ] represents a local array, a[ ] and b[ ] are shared arrays and c[ ] can be either a shared array or a local array.

A runtime call, of statement 502, is inserted before the two created versions of the loop, to return a count of the number of iterations to be prefetched, representing a prefetch window (also referred to as a prefetch factor). Statement 504 introduces the conditional processing of the optimized loop according to a previously determined prefetch factor. Statement 506 indicates a group of statements applicable to a region of the optimized loop comprising the prologue. The prologue portion serves to create descriptions of a subset of the shared data accessed by the loop in the first PF loop iterations.

Statement 508 indicates the existence of compiler generated and inserted add_access statements which are used to describe the first PF shared accesses a[i+1] and b[i+1] effectuated by the original loop to enhanced runtime 304 of FIG. 3. These statements provide enhanced runtime 304 of FIG. 3 with the required information to describe the first PF shared accesses effectuated by the original loop, but not to issue any communication calls to fetch the actual shared data.

Statement 510 indicates a schedule operation in which remote data access is performed. A pair of buffers is allocated by the enhanced runtime (in the schedule call) to hold the results of the remote data accesses. A value of flag is used with the runtime calls to distinguish buffer usage between two buffers containing prefetch data, for example, to analyze and begin fetching to buffer 1. The use of two buffers enables one buffer to be used for prefetching data while the other buffer is used by the optimized loop to consume data prefetched during a preceding schedule call, a technique known as double buffering.

The schedule call at statement 510 precedes the execution of loop 516, enabling enhanced runtime 304 of FIG. 3 to analyze the shared accesses previously collected by statements 508 for recurring communication patterns. Typically access patterns associated with consecutive offsets and constant strides are coalesced. After analysis the schedule call initiates fetching of remote data (for the next iteration of the executor loop) but the process does not wait for the completion of the communication protocol used to retrieve remote data. Within each subsequent schedule call the enhanced runtime waits for completion of the preceding outstanding data transfers.

Statement 512 defines the start of the main loop body within the previously transformed optimized loop and statement 514 indicates a group of statements that applies to a region within the main loop of the optimized loop comprising a prologue for the inner loop. The prologue portion also serves to create descriptions of the subset of shared data accessed required by the next set of loop iterations using statements 508'. The prolog of the inner loop portion also sets a value of flag to a reverse value using statement of flag_reverse=!flag; which is then consumed in statements 508' and 510'.

The process can analyze and begin fetching to buffer 2, while within the schedule call waiting to complete use of buffer 1 as the previous outstanding communication operation is carried out by the network. The process alternates use of a buffer between the fetch and consume operations. For example, two operations can potentially be performed concurrently, the first operation in the pair fills buffer 1 while a second potentially concurrent operation consumes data using buffer 2.

Statements 516 represents a dereference operation. The dereference operation returns to the application the address of a local buffer containing the data prefetched by enhanced runtime 304 of FIG. 3 during a preceding schedule call. The dereference operation also fills in the value of the index into the local buffer where the prefetched data resides for a given shared data access in the original loop. The local buffers filled using a pair of statement 516 are consumed using a statement of c[i+j+1]=buff1[idx1]+buff2[idx2]+d[i+j].

Statement 518 represents a reset operation, which instructs the enhanced runtime to clear portions of the internal data structures used during the scheduling process. For example, the reset operation clears one of the buffers used by a preceding prefetching operation allowing re-use of the cleared buffer in a subsequent prefetching operation. Statement 520 indicates introduction of a wait or pause prior to processing a remaining loop portion (residual loop or epilog loop). The pause is required to allow completion of the last outstanding prefetching operation prior to the execution of the residual loop of statement 522.

Statement 522 indicates processing of the last set of prefetched data. A residual loop is required when the number of loop iterations is not exactly divisible by the prefetch factor and accounts for remaining loop iterations. When no residual loop is required the epilogue loop comprises the last iterations of the loop.

Statement 524 indicates the start of conditional processing of the original loop. Statement 524 would be processed only when the prefetching operation of the transformed loop is not performed.

Figure 6:
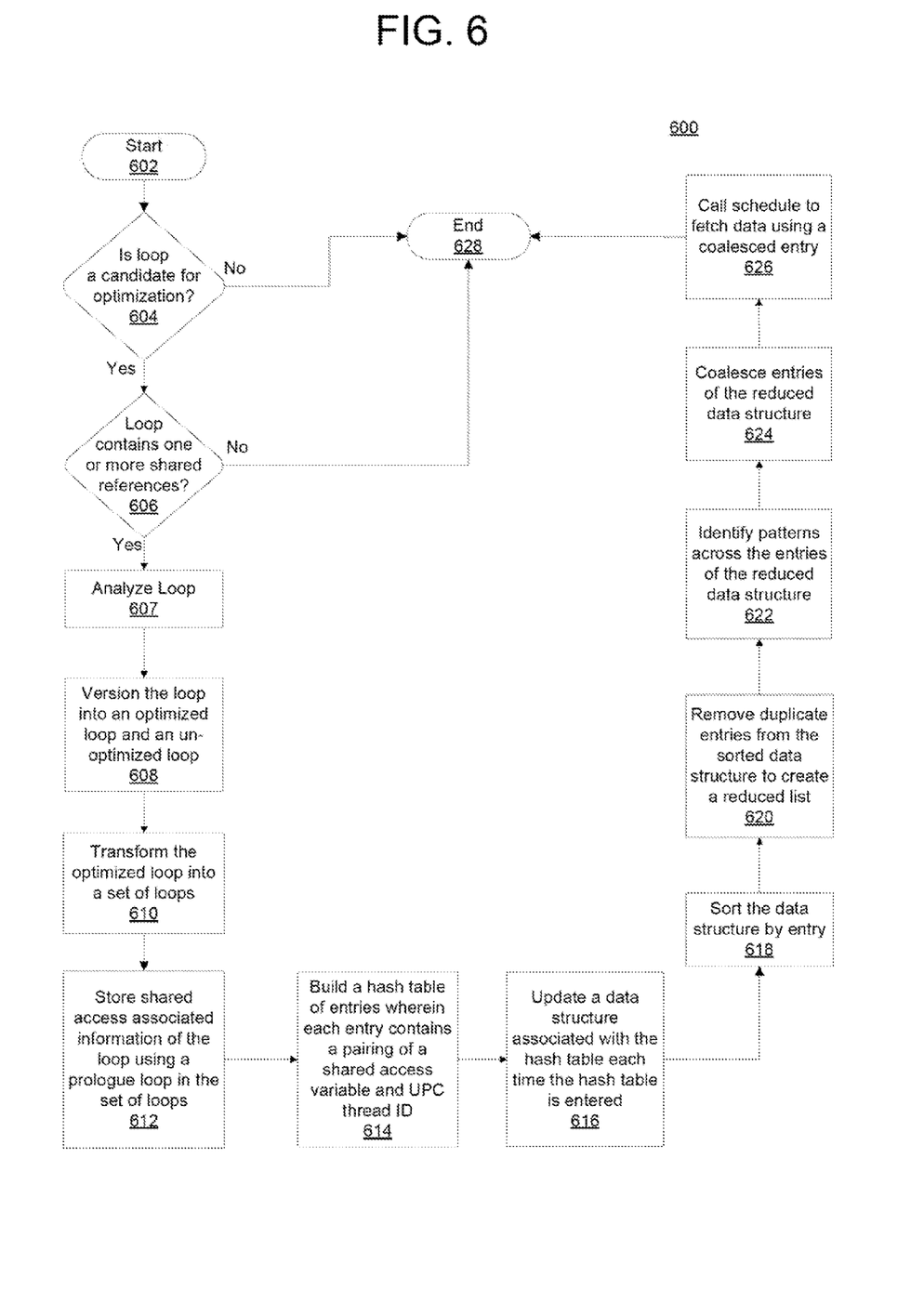
FIG. 6 is a flowchart of process of prefetching data using the loop transformation of FIG. 4, in accordance with one embodiment.

With reference to FIG. 6 a flowchart of a process of prefetching data using the loop transformation of FIG. 4 in accordance with an illustrative embodiment of the disclosure is presented. Process 600 is an example of loop transformation and optimization for shared access processing using system 300 of FIG. 3.

Process 600 comprises two logical portions including a compiler portion and a runtime portion. Process 600 begins at block 602 and proceeds to block 604 where it is determined whether a loop is a candidate for prefetch and coalesce optimization. Several criteria are used in initial analysis of a loop to determine whether the loop is a candidate loop for prefetch and coalesce optimization. The loop is examined to determine whether the loop is well behaved in that the loop does not contain break and continue statements and whether the loop is a normalized loop. The loop is further examined to ensure the loop does not contain procedure calls with side effects in prologue loops, indexing symbols in the prologue loops must not have their address taken, and there are no inter-loop dependencies. Responsive to a determination that the loop is not a candidate loop for prefetch and coalesce optimization, process 600 terminates (block 628).

A loop that is not normalized in the source code might become normalized prior to the prefetching optimization as a result of previous compiler transformations. Normalization of a loop is a well-known technique.

Responsive to a determination that the loop is a candidate loop for prefetch and coalesce optimization, process 600 determines whether the loop has one or more shared references (block 606). Responsive to a determination that the loop does not have one or more shared references, process 600 terminates (block 628).

At block 607, responsive to a determination that the loop does have one or more shared references, process 600, using an enhanced compiler, analyzes the loops containing the shared references. When a shared reference is found in the initially analyzed loop a further analysis is performed on the shared reference to determine whether the shared reference is a candidate for prefetching. A shared reference is a candidate for prefetching when the shared reference represents a shared array access, whether the shared array access is performed directly or indirectly via a pointer to a shared array element. When the loop is a candidate for prefetching and one shared reference in the loop has been identified as a candidate, process 600 analyzes the remaining shared references contained inside the loop. Process 600 determines whether there is more than one candidate shared reference. In general prefetching even a single shared array access in a loop might be profitable. The profitability condition can be determined at runtime by setting the prefetch factor to zero when at runtime execution of the optimized loop is deemed unprofitable.

Process 600, using the enhanced compiler, applies loop versioning to the aforementioned loop to create a copy of the loop as one version of an un-optimized loop and a second version as an optimized loop (block 608). Process 600 also inserts a set of runtime calls during the transformation. A runtime call, inserted before each pair of the optimized version and the original version of the loop, returns a count of the number of iterations to be prefetched, representing a prefetch window (also referred to as a prefetch factor). The value of the prefetch factor is used in subsequent processing as a profitability condition to determine whether to execute the optimized version of the loop or the un-optimized version of the loop. In particular the runtime might determine that execution of the optimized version is not profitable and return a value of zero for the prefetch factor. A costs analysis is performed every time the program selects a proper version of the loop, optimized or not optimized. The cost analysis is performed inside the prefetch factor runtime call.

A compilation sub-process of process 600 transforms the optimized version of the loop of step 608 by splitting the loop into a set of loops comprising, a prologue loop, a main loop, and potentially a residual loop (block 610). After the creation of the prologue loop, main loop and epilogue loop process 600 strip mines the main loop. Process 600 then copies the prologue loop, between the newly created inner and outer loops. Process 600 uses the prefetch factor as a loop strip size. Moreover, the upper bound and lower bound of the copied prologue (which is the inner prologue) loop are modified to prefetch the next iteration of the inner main loop. Finally, by strip mining the main loop, a residual loop might be created by process 600 after the epilogue loop to account for the remaining iterations of the initial loop. When the prefetch factor does not divide the number of original loop iterations exactly, the execution of the remaining loop iterations on the residual loop occurs.

The compilation sub-process of process 600 creates a temporary symbol (flag) to identify which of the buffers to use to either prefetch data or to consume the data. The flag symbol is initialized with a value before the prologue loop and assigned a value of the inverse of the current value of the flag just before the end of the main loop.

For each shared reference the compilation sub-process of process 600 inserts a runtime call in the prologue loops to describe the shared reference to the runtime. The runtime calls generated by the compiler pass sufficient information to the runtime to describe the shared reference (for example, a pointer to the shared object being referenced and the index into the shared object of the shared symbol referenced). After generation of the prologue loop, the compilation sub-process of process 600 inserts the schedule calls before the main loop and before the tiled loop, but after the inner prologue. Furthermore, the compilation sub-process of process 600 inserts reset calls after the end of the inner tiled loop and after the epilogue loop, for recycling the internal runtime data structures.

For each candidate shared reference in the original loop the compilation sub-process of process 600 inserts a dereference runtime call used to retrieve the prefetched value corresponding to the shared reference inside the generated inner main loop and epilogue loop. The dereference runtime call receives the address and size of the shared reference, returns the address of the local data buffer used by the runtime to prefetch the shared reference, and stores the appropriate buffer index into a local variable. Each shared reference can accordingly be replaced with a local access by using the buffer and the buffer index. Then, the compiler searches through statements of the inner main loop and epilogue loop to replace the shared access with a local access in the buffer returned by the runtime call of dereference.

The enhanced runtime sub-process of process 600 is responsible for maintaining the information associated with the shared accesses collected, the analysis of the shared accesses and the scheduling of the communication required to retrieve their associated data. Process 600, using enhanced runtime sub-process collects and stores shared access associated information using a prologue loop in the set of loops (block 612). For each shared access the enhanced runtime sub-process of process 600 stores information including the shared symbol, the related offset inside this symbol, and the element size. The enhanced runtime sub-process is further responsible for tasks including deciding dynamically whether the optimization is worth the cost, storing information associated with the shared references, analyzing the shared references and coalescing when possible, and retrieving the data from the local buffers.

The enhanced runtime sub-process of process 600 includes calls to add_access for adding access for a shared reference, schedule for scheduling of the shared accesses, dereference for recovering the data, and reset to reset the internal data structures of the enhanced runtime (for example, buffers).

Process 600 builds a hash table of entries wherein each entry contains a pairing of a shared access variable with a UPC thread identifier (ID) (step 614). For each pair of a shared access variable and a UPC thread the enhanced runtime sub-process of process 600 searches in a hash table. When a corresponding entry exists in the hash table, the enhanced runtime sub-process of process 600 inserts the offset for the shared access. Otherwise the enhanced runtime sub-process of process 600 creates a new entry and inserts the new entry into the hash table. On each entry (use) of the hash table the enhanced runtime sub-process of process 600 updates a data structure (for example, a list or an array) containing entries representative of the offsets accessed, associated with the hash table (step 616). During this operation the enhanced runtime sub-process of process 600 is not issuing any communication request.

The enhanced runtime sub-process of process 600 analyzes the remote access entries of the data structure (for example, a list, or an array) to identify patterns, which may be used to increase communication efficiency of the "schedule" call. The enhanced runtime sub-process of process 600 performs a sort of the data structure by entry (step 618). The enhanced runtime sub-process of process 600 removes duplicate entries from the sorted data structure to create a reduced data structure (step 620).

The enhanced runtime sub-process of process 600 searches the data structure to identify patterns across the entries of the reduced data structure (step 622). The patterns include, for example, identification of entries having consecutive offsets or constant stride.

The enhanced runtime sub-process of process 600 coalesces entries of the reduced data structure (step 624). In one example, the coalesced entries comprise remote accesses having continuing memory addresses that belong to the same data block. Coalesce operations combine entries of a same identified pattern comprising remote accesses having continuing memory addresses that belong to the same data block into a single coarse-grained access request.

When the enhanced runtime sub-process of process 600 identifies a communication pattern that can be coalesced, the enhanced runtime sub-process of process 600 calls the proper communication functions to start fetching the associated shared data of the coalesced entry (step 626). The coalescing of data accesses increases the communication efficiency compared with previous fine-grained communication accesses of the initial loop. Process 600 terminates thereafter (step 628).

The enhanced runtime sub-process of process 600 uses buffer recycling to limit the overhead associated with dynamic memory allocation. On each call of a reset runtime call the enhanced runtime sub-process of process 600 resets internal data structures including the number of offsets in each hash entry of the hash table and the invalidation of a hash entry itself.

A cost of using an embodiment of the disclosed optimization process may be analyzed for example, using a cost based on a LogP communication model commonly used in parallel machine environments. The following variables are defined for use in the example calculation: RTs=Runtime overhead of communication, RTp=Runtime overhead of prefetch, L=network latency, M=message size and B=bandwidth.

In general, when using fine-grained communication latency is defined as Latency_f=(2*RTs+L+M/B)*N. For coarse-grained communication with prefetching latency is defined as Latency_p=2*RTs+L+M*N/B+RTp. To enable optimization latency is calculated as Latency_f>Latency_p==>(2*RTs+L+M/B)*N>2*RTs+L+M*N/B+RTp. providing a result of (N−1)*(L+2*RTs)>RTp. The calculation can be further generalized assuming RTs<<L when communication occurs off node to create an expression of (N−1)*L>RTp.

Overall, when a number of shared accesses minus one multiplied by the latency of the network is a value larger than the runtime overhead, the optimization is profitable. As an example, the network latency may be provided to the runtime system by the user via a compiler option or directive, or the runtime system may estimate the network latency during the runtime startup phase. Alternatively, the prefetch factor may be provided to the runtime system by the user using an environment variable.

The prefetching optimization is typically not used when execution occurs only in one node. In this case the runtime overhead (RTp) is often larger than the latency of the communication because a program executes on a single node and the runtime uses local load and store operations to transfer data. The overhead associated with not using optimization is much lower when compared with the overhead of scheduling optimizations, that requires keeping information associated with shared accesses, sorting the shared accesses, and analyzing the shared accesses.

Thus, presented in an illustrative embodiment is a computer-implemented process for shared data prefetching and coalescing optimization. The computer-implemented process responsive to a determination that there is one or more shared references in a loop, versions the loop into an optimized loop and an un-optimized loop and transforms the optimized loop into a set of loops, storing shared access associated information of the loop using a prologue loop in the set of loops, wherein the shared access associated information pertains to remote data and is collected using the prologue loop in absence of network communication. The computer-implemented process further builds a hash table of entries, wherein each entry contains a pairing of a shared access variable and a UPC thread ID, updates a data structure associated with the hash table each time the hash table is entered and sorts the data structure by entry to remove duplicate entries from the data structure to create a reduced data structure. The computer-implemented process further identifies patterns across entries of the reduced data structure, coalesces entries of the reduced data structure, fetches data associated with a coalesced entry using a single network communication and populates a local buffer with the fetched data for reuse.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. In the flow charts above, one or more of the methods are embodied in a computer readable storage device containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

Thus, it is important that while an illustrative embodiment of the present invention is described in the context of a fully functional data processing system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. In addition, many modifications may be made to adapt a particular system, device or component thereof to the teachings of the invention without departing from the essential scope thereof. The embodiment was chosen and described in order to best explain the principles of the invention and the practical application, and to enable others of ordinary skill in the art to understand the invention for various embodiments with various modifications as are suited to the particular use contemplated. Therefore, it is intended that the invention not be limited to the particular embodiments disclosed for carrying out this invention, but that the invention will include all embodiments falling within the scope of the appended claims.

Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for shared data prefetching and coalescing optimization, the computer-implemented process comprising:

in response to determining there are one or more shared references in a loop, versioning the loop into an optimized loop and an un-optimized loop;

transforming the optimized loop into a set of loops;

storing shared access associated information of the loop using a prologue loop in the set of loops, wherein the shared access associated information pertains to remote data and is collected using the prologue loop in absence of network communication;

building a hash table of entries, wherein each entry contains a pairing of a shared access variable and a Unified Parallel C (UPC) thread identification (ID);

updating a data structure associated with the hash table each time the hash table is entered;

sorting the data structure by entry;

removing duplicate entries from the data structure to create a reduced data structure;

identifying patterns across entries of the reduced data structure;

coalescing entries of the reduced data structure;

fetching data associated with a coalesced entry using a single network communication; and populating a local buffer with the fetched data for reuse.

2. The computer-implemented method of claim 1, further comprising:

in response to determining there are one or more shared references in a loop, determining whether the loop is a candidate for prefetch and coalescing optimization by analyzing characteristics of the loop according to criteria, the criteria including: whether the loop is well behaved in that the loop does not contain break and continue statements and whether the loop is a normalized loop, whether the loop does not contain procedure calls with side effects in prologue loops, whether indexing symbols in the prologue loops do not have an address taken, and whether there are no inter-loop dependencies;

wherein a shared symbol is one of a pointer to a shared reference and strictly defined symbols, in the loop that is ignored to preserve memory consistency semantics; and wherein transforming the optimized loop into a set of loops further comprises inserting a runtime call, before the optimized loop and the un-optimized loop, which returns a count of a number of iterations to be prefetched representing a prefetch factor.

3. The computer-implemented method of claim 1, wherein transforming the optimized loop into a set of loops further comprises:

creating a prologue loop, a main loop, and a residual loop, wherein the residual loop is created after an epilogue loop for last iterations of an initial loop when the prefetch factor does not divide exactly into a number of loop iterations, and wherein the last remaining operations therein will not be prefetched;

strip mining the main loop using the prefetch factor as a loop strip size to form newly created inner and outer loops;

copying the prologue loop, between the newly created inner and outer loops wherein an upper bound and a lower bound of the copied prologue loop are modified to prefetch a next iteration of an inner main loop;

creating a temporary flag symbol to identify which buffer to use to either prefetch data or to access data, wherein the flag symbol is initialized with a value before the prologue loop and assigned a value of the inverse of the current value of the flag symbol just before an end of the main loop;

inserting a runtime call in the prologue loops for adding a shared reference to a runtime for each shared reference, wherein the runtime calls use a pointer to a shared variable and an indexing value;

inserting schedule calls to the runtime before the main loop and before a tiled loop, but after the inner prologue loop;

inserting reset calls to the runtime after an end of the inner tiled loop and after the epilogue loop, for recycling internal runtime structures;

inserting, inside the inner main loop and the epilogue loop, runtime calls for dereference for each shared reference, wherein the dereference returns a buffer and sets a variable for indexing into the buffer enabling each shared reference to be replaced with a local access by using the buffer and the index;

inserting a runtime call of wait prior to the epilogue loop, to wait for a previous data transfer operation to complete; and replacing a shared access with a local access in the buffer returned by the dereference for each shared access located in the inner main loop and epilogue loop.

4. The computer-implemented method of claim 1 wherein storing shared access associated information using a prologue loop in the set of loops further comprises:

collecting information for each shared access including information for a shared symbol, a related offset inside the shared symbol, a blocking factor, an element size, a flag, and a type of access indicating one of a read, write or combination thereof.

5. The computer-implemented method of claim 1, wherein identifying patterns across entries of the reduced data structure further comprises:

identifying entries from the reduced data structure having consecutive offsets and constant stride.

6. The computer-implemented method of claim 1, wherein coalescing entries of the reduced data structure further comprises:

combining entries of a same identified pattern, comprising remote accesses having continuing memory addresses that belong to a same data block, into a single coarse grained access request.

7. The computer-implemented method of claim 1, wherein building a hash table of entries each containing a pairing of a shared access variable and a UPC thread ID further comprises:

searching in a hash table for each pair of a shared access variable and a UPC thread;

responsive to locating a corresponding entry in the hash table, inserting an offset for a shared access; and responsive to not locating a corresponding entry in the hash table, creating a new entry in the hash table, wherein updating the hash table does not issue a communication request for shared access.

8. A computer program product for shared data prefetching and coalescing optimization, the computer program product comprising:
a computer readable memory having computer executable program code stored thereon for:
in response to determining there are one or more shared references in a loop, versioning the loop into an optimized loop and an un-optimized loop;
transforming the optimized loop into a set of loops;
storing shared access associated information of the loop using a prologue loop in the set of loops, wherein the shared access associated information pertains to remote data and is collected using the prologue loop in absence of network communication;
building a hash table of entries, wherein each entry contains a pairing of a shared access variable and a Unified Parallel C (UPC) thread identification (ID);
updating a data structure associated with the hash table each time the hash table is entered;
sorting the data structure by entry;
removing duplicate entries from the data structure to create a reduced data structure;
identifying patterns across entries of the reduced data structure;
coalescing entries of the reduced data structure;
fetching data associated with a coalesced entry using a single network communication; and
populating a local buffer with the fetched data for reuse.

9. The computer program product of claim 8, the computer executable program code further comprising code for:
in response to determining there are one or more shared references in a loop, determining whether the loop is a candidate for prefetch and coalescing optimization by analyzing characteristics of the loop according to criteria, the criteria including: whether the loop is well behaved in that the loop does not contain break and continue statements and whether the loop is a normalized loop, whether the loop does not contain procedure calls with side effects in prologue loops, whether indexing symbols in the prologue loops do not have an address taken, and whether there are no inter-loop dependencies;
wherein a shared symbol is one of a pointer to a shared reference and strictly defined symbols, in the loop that is ignored to preserve memory consistency semantics; and
wherein transforming the optimized loop into a set of loops further comprises inserting a runtime call, before the optimized loop and the un-optimized loop, which returns a count of a number of iterations to be prefetched representing a prefetch factor.

10. The computer program product of claim 8, wherein the computer executable program code for transforming the optimized loop into a set of loops further comprises code for:
creating a prologue loop, a main loop, and a residual loop, wherein the residual loop is created after an epilogue loop for last iterations of an initial loop when the prefetch factor does not divide exactly into a number of loop iterations, and wherein the last remaining operations therein will not be prefetched;
for strip mining the main loop using the prefetch factor as a loop strip size to form newly created inner and outer loops;
copying the prologue loop, between the newly created inner and outer loops wherein an upper bound and a lower bound of the copied prologue loop are modified to prefetch a next iteration of an inner main loop;
creating a temporary flag symbol to identify which buffer to use to either prefetch data or to access data, wherein the flag symbol is initialized with a value before the prologue loop and assigned a value of the inverse of the current value of the flag symbol just before an end of the main loop;
inserting a runtime call in the prologue loops for adding a shared reference to a runtime for each shared reference, wherein the runtime calls use a pointer to a shared variable and an indexing value;
inserting schedule calls to the runtime before the main loop and before a tiled loop, but after the inner prologue loop;
inserting reset calls to the runtime after an end of the inner tiled loop and after the epilogue loop, for recycling internal runtime structures;
inserting, inside the inner main loop and the epilogue loop, runtime calls for dereference for each shared reference, wherein the dereference returns a buffer and sets a variable for indexing into the buffer enabling each shared reference to be replaced with a local access by using the buffer and the index;
inserting a runtime call of wait prior to the epilogue loop, to wait for a previous data transfer operation to complete; and
replacing a shared access with a local access in the buffer returned by the dereference for each shared access located in the inner main loop and epilogue loop.

11. The computer program product of claim 8, wherein the computer executable program code for storing shared access associated information using a prologue loop in the set of loops further comprises code for:
collecting information for each shared access, the information including information for a shared symbol, a related offset inside the shared symbol, a blocking factor, an element size, a flag, and a type of access indicating one of a read, write or combination thereof.

12. The computer program product of claim 8, wherein computer executable program code for identifying patterns across entries of the reduced data structure further comprises code for:
identifying entries from the reduced data structure having consecutive offsets and constant stride.

13. The computer program product of claim 8, wherein the computer executable program code for coalescing entries of the reduced data structure further comprises code for:
combining entries of a same identified pattern, comprising remote accesses having continuing memory addresses that belong to a same data block, into a single coarse grained access request.

14. The computer program product of claim 8, wherein the computer executable program code for building a hash table of entries that each contains a pairing of a shared access variable and a UPC thread ID, further comprises code for:
searching in a hash table for each pair of a shared access variable and a UPC thread;
in response to locating a corresponding entry in the hash table, inserting an offset for a shared access; and
in response to not locating a corresponding entry in the hash table, creating a new entry in the hash table, wherein updating the hash table does not issue a communication request for shared access.

15. A system for shared data prefetching and coalescing optimization, the system comprising:
a communications fabric;

a memory connected to the communications fabric, wherein the memory contains computer executable program code; and a processor unit connected to the communications fabric, wherein the processor unit executes the computer executable program code to direct the system to:

in response to determining there are one or more shared references in a loop, version the loop into an optimized loop and an un-optimized loop;

transform the optimized loop into a set of loops;

store shared access associated information of the loop using a prologue loop in the set of loops, wherein the shared access associated information pertains to remote data and is collected using the prologue loop in absence of network communication;

build a hash table of entries, wherein each entry contains a pairing of a shared access variable and a Unified Parallel C (UPC) thread identification (ID);

update a data structure associated with the hash table each time the hash table is entered;

sort the data structure by entry;

remove duplicate entries from the data structure to create a reduced data structure;

identify patterns across entries of the reduced data structure;

coalesce entries of the reduced data structure;

fetch data associated with a coalesced entry using a single network communication; and populate a local buffer with the fetched data for reuse.

16. The system of claim 15, the computer executable program code further comprises code to direct the system to:

in response to determining there are one or more shared references in a loop, determine whether the loop is a candidate for prefetch and coalescing optimization by analyzing characteristics of the loop according to criteria, the criteria including: whether the loop is well behaved in that the loop does not contain break and continue statements and whether the loop is a normalized loop, whether the loop does not contain procedure calls with side effects in prologue loops, whether indexing symbols in the prologue loops do not have an address taken, and whether there are no inter-loop dependencies;

wherein a shared symbol is one of a pointer to a shared reference and strictly defined symbols, in the loop that is ignored to preserve memory consistency semantics; and wherein transforming the optimized loop into a set of loops further comprises inserting a runtime call, before the optimized loop and the un-optimized loop, which returns a count of a number of iterations to be prefetched representing a prefetch factor.

17. The system of claim 15, the computer executable program code to transform the optimized loop into a set of loops further comprising executable program code that directs the system to:

create a prologue loop, a main loop, and a residual loop, wherein the residual loop is created after an epilogue loop for last iterations of an initial loop when the prefetch factor does not divide exactly into a number of loop iterations, and wherein the last remaining operations therein will not be prefetched;

strip mine the main loop using the prefetch factor as a loop strip size to form newly created inner and outer loops;

copy the prologue loop, between the newly created inner and outer loops wherein an upper bound and a lower bound of the copied prologue loop are modified to prefetch a next iteration of an inner main loop;

create a temporary flag symbol to identify which buffer to use to either prefetch data or to access data, wherein the flag symbol is initialized with a value before the prologue loop and assigned a value of the inverse of the current value of the flag symbol just before an end of the main loop;

insert a runtime call in the prologue loops for adding a shared reference to a runtime for each shared reference, wherein the runtime calls use a pointer to a shared variable and an indexing value;

insert schedule calls to the runtime before the main loop and before a tiled loop, but after the inner prologue loop;

insert reset calls to the runtime after an end of the inner tiled loop and after the epilogue loop, for recycling internal runtime structures;

insert, inside the inner main loop and the epilogue loop, runtime calls for dereference for each shared reference, wherein the dereference returns a buffer and sets a variable for indexing into the buffer enabling each shared reference to be replaced with a local access by using the buffer and the index;

insert a runtime call of wait prior to the epilogue loop, to wait for a previous data transfer operation to complete; and replace a shared access with a local access in the buffer returned by the dereference for each shared access located in the inner main loop and epilogue loop.

18. The system of claim 15, the computer executable program code to store shared access associated information using a prologue loop in the set of loops further comprising executable program code that directs the system to:

collect information for each shared access, the information including information for a shared symbol, a related offset inside the shared symbol, a blocking factor, an element size, a flag, and a type of access indicating one of a read, write or combination thereof.

19. The system of claim 15, the computer executable program code to identify patterns across entries of the reduced data structure further comprising executable program code that directs the system to:

identify entries from the reduced data structure having consecutive offsets and constant stride.

20. The system of claim 15, the computer executable program code to coalesce entries of the reduced data structure further comprising executable program code that directs the system to:

combine entries of a same identified pattern, comprising remote accesses having continuing memory addresses that belong to a same data block, into a single coarse grained access request.

* * * * *